(12) United States Patent
Sahita et al.

(10) Patent No.: US 8,862,853 B2
(45) Date of Patent: Oct. 14, 2014

(54) SYSTEM AND METHOD FOR HIGH PERFORMANCE SECURE ACCESS TO A TRUSTED PLATFORM MODULE ON A HARDWARE VIRTUALIZATION PLATFORM

(75) Inventors: Ravi Sahita, Beaverton, OR (US); Travis T. Schluessler, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/305,902

(22) Filed: Nov. 29, 2011

(65) Prior Publication Data

US 2012/0117614 A1    May 10, 2012

Related U.S. Application Data

(62) Division of application No. 11/967,683, filed on Dec. 31, 2007, now Pat. No. 8,090,919.

(51) Int. Cl.
| | |
|---|---|
| *G06F 12/00* | (2006.01) |
| *G06F 13/00* | (2006.01) |
| *G06F 13/28* | (2006.01) |
| *G06F 21/53* | (2013.01) |
| *G06F 12/14* | (2006.01) |

(52) U.S. Cl.
CPC ............ *G06F 12/1491* (2013.01); *G06F 21/53* (2013.01)
USPC ........................................................ 711/173

(58) Field of Classification Search
None
See application file for complete search history.

(56) References Cited

U.S. PATENT DOCUMENTS

| | | | |
|---|---|---|---|
| 7,761,674 B2 | 7/2010 | Durham et al. | |
| 8,037,318 B2 * | 10/2011 | Tahan ............................ | 713/189 |
| 8,090,919 B2 | 1/2012 | Sahita et al. | |
| 2003/0074548 A1 | 4/2003 | Cromer et al. | |
| 2005/0246552 A1 | 11/2005 | Bade et al. | |
| 2006/0026419 A1 | 2/2006 | Arndt et al. | |
| 2007/0005992 A1 | 1/2007 | Schluessler et al. | |
| 2007/0006175 A1 | 1/2007 | Durham et al. | |

* cited by examiner

*Primary Examiner* — April Y Blair
*Assistant Examiner* — Gary W Cygiel
(74) *Attorney, Agent, or Firm* — Barnes & Thornburg LLP

(57) ABSTRACT

A system and method for high performance secure access to a trusted platform module on a hardware virtualization platform, which includes Virtual Machine Monitor (VMM) managed components coupled to the VMM and a plurality of Virtual Machines (VMs). One of the VMM managed components is a Trusted Platform Module (TPM) Each virtual machine includes a guest Operating System, a TPM device driver (TDD), and at least one security application. The VMM creates an intra-partition in memory for each TDD such that other code and information at a same or higher privilege level in the VM cannot access the TDD's memory contents. The VMM also maps access only from the TDD to a TPM register space specifically designated for the VM requesting access. Contents of the TPM requested by the TDD are stored in an exclusively VMM-managed protected page table that provides hardware-based memory isolation for the TDD.

20 Claims, 9 Drawing Sheets ized according to an embodiment of the present invention.

SYSTEM AND METHOD FOR HIGH PERFORMANCE SECURE ACCESS TO A TRUSTED PLATFORM MODULE ON A HARDWARE VIRTUALIZATION PLATFORM

RELATED APPLICATIONS

This application is a divisional application of U.S. application Ser. No. 11/967,683, entitled "SYSTEM AND METHOD FOR HIGH PERFORMANCE SECURE ACCESS TO A TRUSTED PLATFORM MODULE ON A HARDWARE VIRTUALIZATION PLATFORM," which was filed on Dec. 31, 2007.

This application is related to U.S. patent application Ser. No. 11/395,488, filed on Mar. 30, 2006, which is a continuation-in-part of U.S. patent application Ser. Nos. 11/173,851, filed on Jun. 30, 2005, and 11/322,669, filed on Dec. 30, 2005, all of which are assigned to the assignee of the present invention.

BACKGROUND OF THE INVENTION

1. Field of the Invention

The present invention is generally related to platform security. More particularly, the present invention is related to a system and method for high performance secure access to a trusted platform module on a hardware virtualization platform.

2. Description

A Trusted Platform Module (TPM) is a discrete, passive hardware component that exposes a specific set of security functionality or commands to a host platform and operating system (OS). The commands can be used to generate derived protected keys stored inside the TPM and sign and/or verify data using those derived protected keys. The host platform and OS use a slow serial bus interface to send commands to and obtain results from the TPM. The slow serial bus interface limits the use of the TPM to low performance applications and precludes its use in high performance applications.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention describe an apparatus and method for achieving high performance access to a Trusted Platform Module (TPM) in a virtualization technology (VT) enabled host platform without loss of performance (in terms of added virtual device models) or loss of security. This is accomplished using a virtualized model that enables a guest OS (Operating System) or VM (Virtual Machine) to run a TPM device driver (TDD), and a VMM (Virtual Machine Monitor) to create a partition in memory for the TDD in the guest OS such that any other code at the same privilege level in the guest OS cannot access the memory contents of the TPM device driver and to map accesses to the TPM to the correct register set designated for the guest OS. Contents of the TPM requested by the TPM device driver are stored in an exclusively VMM-managed protected page table that provides hardware-based memory isolation for the TDD.

Embodiments of the present invention preserve the security properties of the TPM even when the contents are outside of the TPM, that is, stored in the partitioned memory. This enables little direct interaction with the slow interface of the TPM on the part of the security application, yet provides high access to the contents of the TPM by accessing a partitioned memory solely dedicated to the TPM device drivers.

Figure 1:
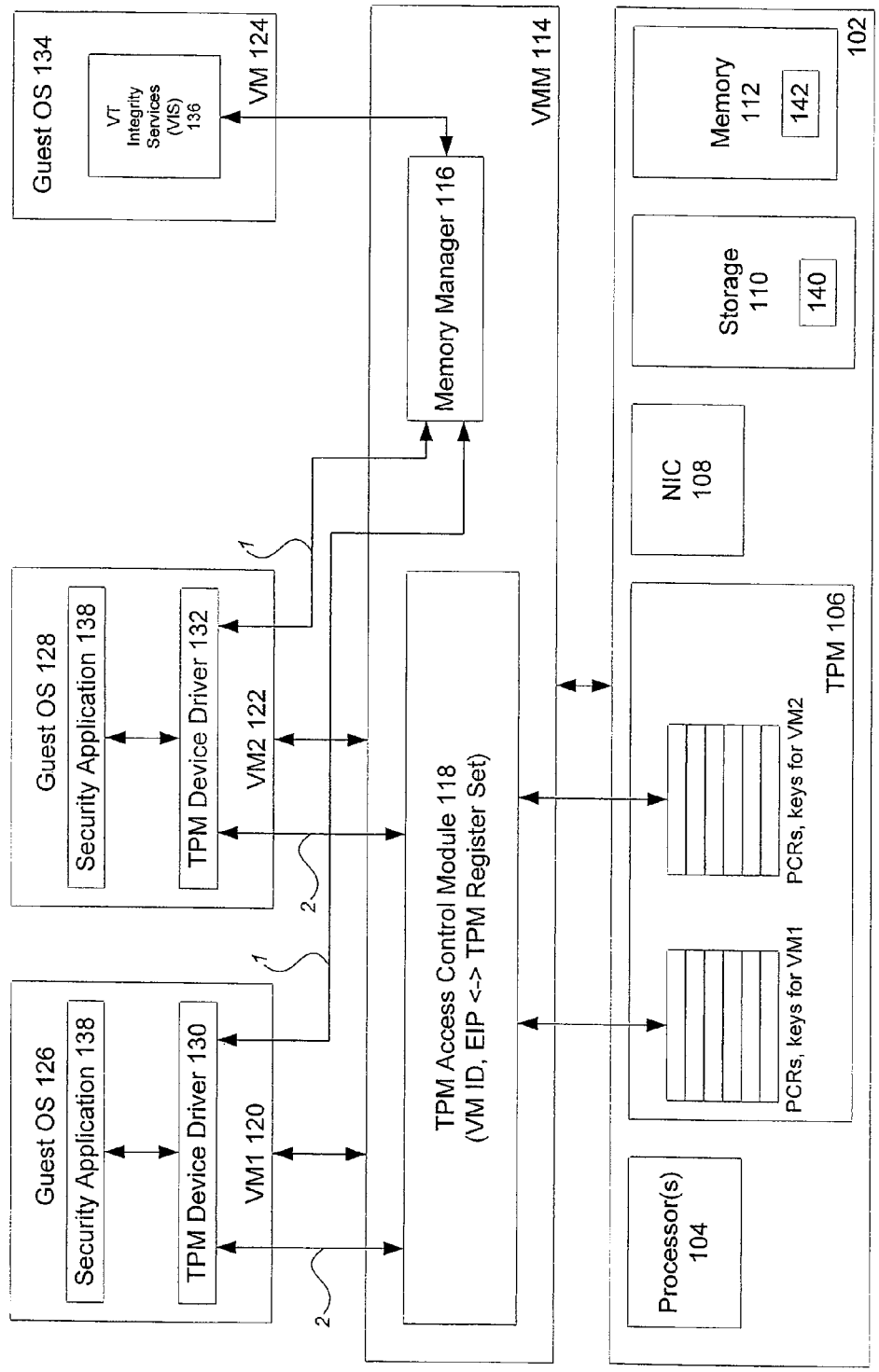
FIG. 1 is a block diagram illustrating an exemplary Virtualization Technology (VT) enabled host platform 100 in which a Trusted Platform Module (TPM) is virtualized according to an embodiment of the present invention.

FIG. 1 is a block diagram illustrating an exemplary Virtualization Technology (VT) enabled host platform 100 in which a Trusted Platform Module (TPM) is virtualized according to an embodiment of the present invention. Host platform 100 comprises a plurality of Virtual Machine Monitor (VMM) managed components 102 having the VMM 114 running directly on top of VMM managed components 102.

VMM managed components may be implemented in hardware, software, or firmware, or a combination thereof. VMM managed components 102 may include one or more processor(s) 104, a TPM 106, a network interface controller (NIC) 108, storage 110, and memory 112. Host platform 100 further comprises a plurality of Virtual Machines (VMs) 120 and 122, each of VMs 120 and 122 having a guest operating system (OS) 126 and 128, respectively, at least one security application 138, respectively, and a TPM device driver 130 and 132, respectively, running on top of VMM 114. System 100 may also include an auxiliary VM 124 having a guest operating system 134 and a VT Integrity Services (VIS) module 136.

Processor(s) 104 may execute programming instructions of components on platform 100. Processor(s) 104 may be single and/or multiple core processor(s), controller(s), application specific integrated circuit(s) (ASIC(s)), etc.

Trusted Platform Module (TPM) 106 is a hardware device having cryptographic functionalities that provide a root of trust to a host platform on which it resides, such as platform 100, and extends that trust to other parts of the platform by building a chain of trust. TPM 106 provides a set of cryptographic operations that execute in a protected environment. Such operations may include, but are not limited to, performing encryption/decryption, computing hash values of small pieces of data, generating keys, such as, for example, an Endorsement Key (EK) (i.e., a public/private key-pair) and other types of keys for various security purposes, such as, for example, signing data, verifying data, etc. The EK is unique for each TPM and the private component of the key-pair is generated within TPM 106 and is never exposed outside of TPM 106, thereby enabling TPM 106 to provide the root of trust. TPM 106 is typically accessed using a Low Pin Count (LPC) bus interface (not explicitly shown).

TPM 106 provides a safe place to store information. TPM 106 also stores and reports integrity metrics, such as, for example, the measurement of integrity of BIOS (Basic Input/Output System) code at system startup. TPM 106 includes a set of register space referred to as PCRs (Platform Configuration Registers) for storing the information and keys. In an embodiment of the present invention, the PCR register space is partitioned across multiple VMs, such as, for example VMs 120 and 122, so that each VM has a true view (that is, dedicated portion) of the PCR register space. In today's TPMs there are thirty-two (32) PCRs, therefore, in an embodiment in which two VMs would need to communicate with the TPM, the TPM could be virtualized such that some subset of PCRs would be provided to each VM (sixteen each in one embodiment). Although the current TPMs contain thirty-two PCRs, embodiments of the present invention are not limited to 32 PCRs. In fact, embodiments of the present invention may operate with more or less PCRs. For example, if the next generation TPM includes more than 32 PCRs, there would be more space to allocate across the VMs requiring access to the TPM. If the next generation TPM includes less than 32 PCRs, then there would be less space to allocate across the VMs requiring access to the TPM.

Although PCRs are divided amongst the VMs requiring access to the TPM, the components inside the TPM that sign or ratify data using certain keys are common across the VMs, irrespective of the VM that is making a request. In one embodiment, a root key may be derived from the EK for each VM requiring access to the TPM. Other keys may then be derived from the root key for that VM.

NIC 108 enables platform 100 to communicate with other entities over a network (not shown). The network may be any type of network, such as, for example, a local area network, a metropolitan area network, a wide area network, an intranet, an Internet, etc.

In an embodiment, storage 110 may represent non-volatile storage to store persistent content to be used for the execution of the components on platform 100, such as, but not limited to, operating system(s), program files, configuration files, etc. In an embodiment, storage 110 may include stored content 140, which may represent the persistent store of source content for a device driver, such as device drivers 130 and 132. The persistent store of source content may include, for example, executable code store that may have executable files and/or code segments, links to other routines, such as, for example, a call to a dynamic linked library (DLL), a data segment, etc.

In embodiments, storage 110 may include integrated and/or peripheral storage devices, such as, but not limited to, disks and associated drives (e.g., magnetic, optical), universal serial bus (USB) storage devices and associated ports, flash memory, ROM (Read-Only Memory), non-volatile semiconductor devices, etc. In embodiments, storage 110 may be a storage resource physically part of platform 100 or it may be accessible by, but not necessarily a part of, platform 100. For example, storage 110 may be accessed by platform 100 over a network (not shown) via NIC 108.

Upon a load request, such as, for example, from a loading agent of guest OS 126 or 128, VMM 114 and/or guest OS 126 or 128 may load the stored content 140 from storage 110 into memory 112 as active content 142 for operation of TPM device driver 126 or 128, respectively, in the execution environment of VM 120 or 122, respectively.

In an embodiment, memory 112 may be volatile storage to provide active content for operation of components on platform 100. In embodiments, memory 112 may include RAM (Random Access Memory), dynamic RAM (DRAM), static RAM (SRAM), synchronous DRAM (SDRAM), dual-data rate RAM (DDRRAM), etc.

In some embodiments, memory 112 may organize content stored therein into a number of groups of memory locations to facilitate virtual memory management. The groups of memory locations may be pages, segments, or a combination thereof.

A virtual memory utilizing paging may facilitate the emulation of a large logical/linear address space with a smaller physical memory page. Thus, the execution environment for a VM may provide a virtual execution environment in which the components may operate, which may then be mapped into physical pages of memory 112. Page tables maintained by OS (128 and 130) and/or VMM 114 may map the logical/linear addresses provided by components of the VMs (120, 122, and 124) to physical address of memory 112.

In one embodiment, TPM device drivers 130 and 132, or portions thereof, may be selected for intra-partitioning and VMM 114 may identify and partition off portions of TPM device drivers 130 and 132 to control access by OSs 126 and 128 to TPM device drivers 130 and 132. Partitioned portions may include any portion, up to all, of the particular component. A partitioned portion may be sequestered, either physically or virtually, from other components within the same VM, such that intra-partitioning may facilitate insulation of, for example, TPM device drivers 130 and 132 from OSs 126 and 128, respectively, without requiring that TPM device drivers 130 and 132 operate in an entirely separate VM 120 and 122, respectively, with a separate OS. Intra-partitioning may also afford TPM device drivers 130 and 132 a level of protection from other components, even those of similar or higher privilege levels, within VMs 120 and 122 that may be compromised in some manner, such as, for example, by malware, critical runtime failures, etc. Embodiments of the present invention may provide for this protection while still allowing permitted interactions between TPM device drivers 130 and 132 and other components, such as, for example, the operating systems of VMs 120 and 122, respectively.

Virtual machine monitor (VMM) 114 allows platform 100 to run multiple guest Operating Systems (OSs) simultaneously and independently, with each Operating System (OS) having its own isolated environment, that is, VMs 120, 122, and 124, for software execution. VMM 114 runs directly on top of VT enabled hardware, such as, for example, processor(s) 104, TPM 106, NIC 108, storage 110, and memory 112, and has full access to all of the resources in platform 100. VMM 114 may present multiple views of VT hardware 102 to the one or more independently operating VMs 120, 122, and 124. VMM 114 may be implemented in software, hardware, firmware, and/or any combination thereof. VMM 114 may include, inter alfa, a memory manager 116 and a TPM access control module 118.

Memory manager 116 may be used to create an intra-partition between components in the same VM/guest OS. For example, with regards to VM 120/guest OS 126, memory manager 116 may create an intra-partition memory for TPM device driver 130 of VM guest Operating System (OS) 126 so that any other software applications at the same or higher privilege level will not have access to the memory contents of TPM device driver 130 for that guest OS. This ensures that memory pages allocated for TPM device driver 130 are not accessible to other software applications on VM 120.

TPM access control module 118 provides partitioning of the Platform Configuration Registers (PCRs) amongst the VMs (120, 122) that require access to TPM 106. TPM access control module 118 maps I/O (input/output) accesses to a specific PCR register set of TPM 106 based on the specific VM accessing TPM 106. In one embodiment, the VM ID (identification) may be used as an offset to a register bank. For example, when there are two VMs that may need access to TPM 106, wherein TPM 106 has 32 PCRs, the first VM, referred to as VM1, may access PCR register set 0-15 and the second VM, referred to as VM2, may access register set 16-31. In one embodiment, a Virtual Machine Control Structure (VMCS) is used to identify the VM. The VMCS structure consists of a VM ID (Identification) field and an Execution Instruction Pointer (EIP) field. The VM ID field identifies the VM. The EIP field is a pointer for the corresponding PCR register set.

TPM commands include a field referred to as the locality field. The locality field may identify a mode of operation. For example, if the locality field is 0, TPM 106 will know that platform 100 is in the boot up stage or BIOS mode. If the locality field is 1, TPM 106 will know that platform 100 has completed the boot up stage and is now interacting with the operating system or is in the OS mode. This is very important because there are certain operations that are privileged and are only allowed when platform 100 is operating in the BIOS mode versus the OS mode. TPM 106 must be able to discern whether platform 100 is being formatted for the first time or is being accessed after being formatted so that TPM 106 may implement formal security checks. Thus, this is the notion of locality. With embodiments of the present invention, the notion of locality is extended to provide identification of a VM that is requesting access to the TPM. For example, locality 5 may indicate that VM1 (120) is requesting access to TPM 106, locality 6 may indicate that VM2 (122) is requesting access to TPM 106, etc. Thus, the present invention extends the notion of locality to include identification of a VM requesting access to the TPM without destroying any of the security properties of the platform. TPM access control module 118 may be implemented in hardware, software, or a combination thereof.

As previously indicated, VMs 120, 122, and 124 contain guest Operating Systems (OSs) that run on top of VMM 114. VMs 120, 122, and 124 are configured to execute code, such as, for example, security applications 138, independently, with each VM (120, 122, and 124) being securely isolated from the others. In other words, the components operating in VM 120, VM 122, and VM 124 may each operate as if they were each running on a dedicated computer rather than a virtual machine. That is, components operating in VM 120, VM 122, and VM 124 may each expect to control various events and have complete access to VT hardware 102. VMM 114 may manage VM access to VT hardware 102.

In an embodiment, VMs 120 and 122 may include security applications 138. Security applications 138 may include any applications running on platform 100 that require TPM services. TPM device drivers 130 and 132 are APIs (Application Programming Interfaces) that enable security applications 138 to access TPM 106. In one embodiment, TPM device drivers 130 and 132 may be implemented as a DLL (Dynamic Link Library) that is linked directly into security applications 138.

VM 124 may include a VT Integrity Services (VIS) module 136 to provide security enhancements. VIS module 136 enables host software agents to register themselves for protection with VMM 114. VM 124 may be configured to execute code independently, may be securely isolated from VM 120 and VM 122, and may prevent components of VMs 120 and 122 from performing operations that would alter, modify, read, or otherwise affect the components of VM 124. VIS module 136 manages memory manager 116, and performs other miscellaneous management functions. While platform 100 shows three VMs, other embodiments may employ any number of VMs.

In one embodiment, upon a designated event, VMM 114 may identify and partition off portions of TPM device drivers 130 and 132 to control access to the partitioned portions by OSs 126 and 128, respectively. In one embodiment, a designated event may be when stored content 140 is loaded from storage 110 into memory 112 as active content 142. In other embodiments, other designated events may be additionally or alternatively used.

Figure 2:
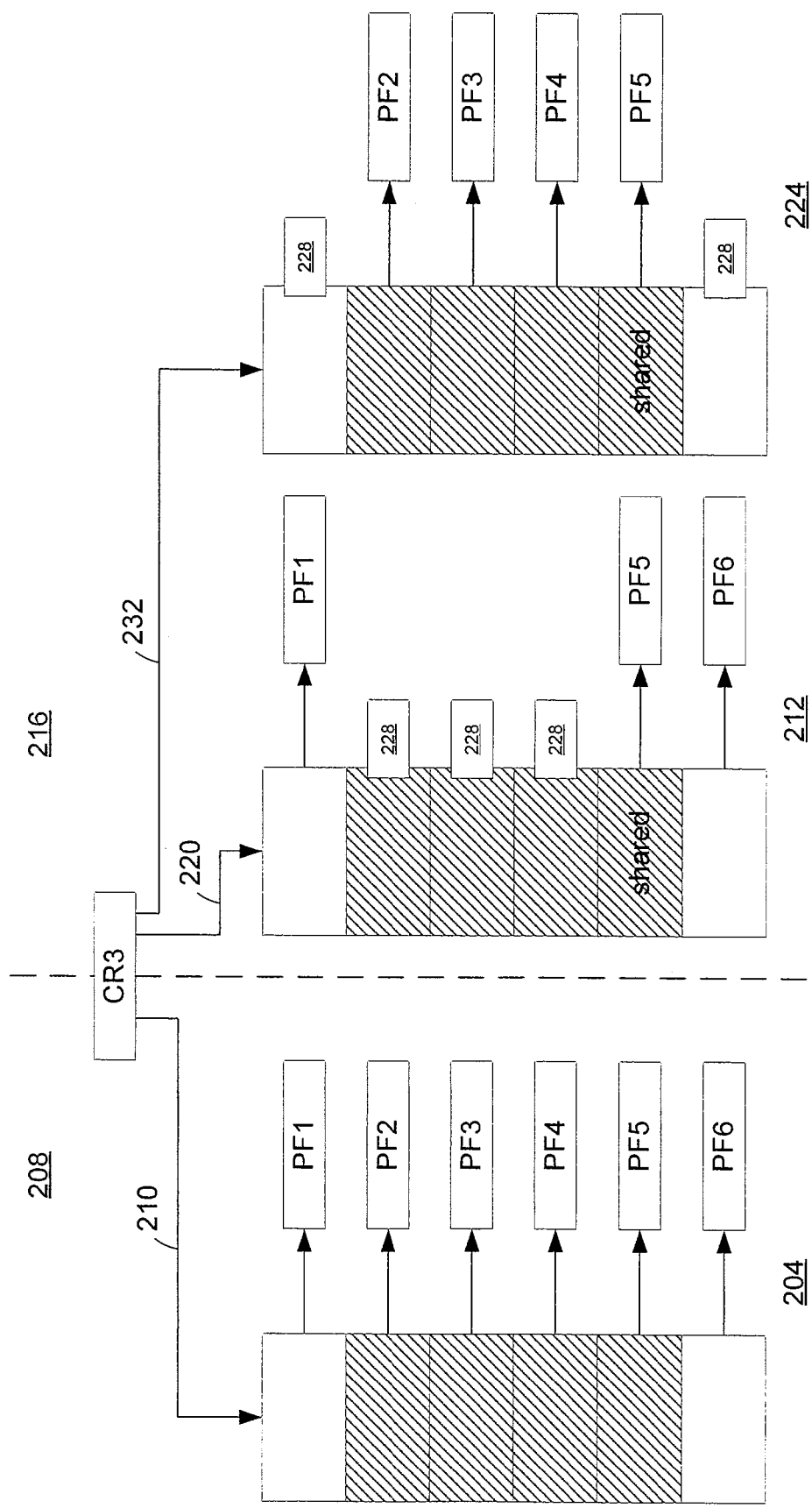
FIG. 2 illustrates intra-partitioning of portions of a TPM device driver in accordance with an embodiment of the present invention.

FIG. 2 illustrates intra-partitioning of portions of a TPM device driver in accordance with an embodiment of the present invention. TPM device driver 130 of VM 120 is being used for explanation purposes only. In this embodiment, OS 126 may create a guest page table (GPT) 204 in an OS domain 208 mapping linear addresses of components executing in VM 120 to physical addresses or page frames. TPM device driver 130 may be set to occupy the $2^{nd}$ through $5^{th}$ page table entries (PTEs), which refer to page frames having active content 142, such as, PF2-PF5. As is the case in VT platforms, VMM 114 may monitor and trap register changes, such as, for example, in the x86 architecture register CR3 (manufactured by Intel Corporation of Santa, Clara, Calif.). When OS 126 creates GPT 204 and provides a CR3 value 210 pointing to GPT 204, VMM 114 may trap on the CR3 change, create an active page table (APT) 212 (which may be a duplicate copy of GPT 204) in the VMM domain 216, and change CR3 value 210 to value 220 pointing to APT 212. In this way, VMM 114 may coordinate accesses to memory 112 from a number of VMs, or applications within a VM, such as, for example, VM 120, VM 122, and VM 124.

In this embodiment, VMM 114 may also create a protected page table (PPT) 224. VMM 114 may copy the page frames having active content 142, such as, PF2-PF5, into PPT 224 and assign the page table entries (PTEs) that do not refer to those page frames, such as, for example, $1^{st}$ PTE and $6^{th}$ PTE, with access characteristics 228 to cause a page fault upon execution. In various embodiments, access characteristics 228 may be 'not present', 'execute disabled', and/or read-only. In an embodiment, access characteristics 228 may be 'not present' or a combination of 'execute disable' and read-only to prevent unauthorized modifications to active content 142 from VM 120. In various embodiments, the setting of access characteristics 228 may be done by VMM 114, TPM device driver 130, and/or OS 126.

VMM 114 may assign the PTEs of APT 212 that refer to page frames having partitioned portions of TPM device driver 130, such as, $2^{nd}$ PTE-$4^{th}$ PTE, with access characteristics 228. It may be noted that some page frames, such as, for example, PF5, may be shared between partitioned and non-partitioned elements. Therefore, in an embodiment, the $5^{th}$ PTE may not have access characteristics 228 set in either APT 212 or PPT 224.

In this embodiment, execution flow between APT 212 and PPT 224 may be managed as follows. Initially, CR3 may have value 220 pointing to APT 212. An execution instruction pointer (EIP) may start with the $1^{st}$ PTE of APT 212 and, upon an attempted access of the $2^{nd}$ PTE, may cause a page fault due to access characteristics 228, pointing to PPT 224. The EIP may resume operation at the $2^{nd}$ PTE of PPT 224, which may be a partitioned element. The EIP may execute through the $3^{rd}$ PTE, the $4^{th}$ PTE and the $5^{th}$ PTE. When the EIP attempts to access the $6^{th}$ PTE, access characteristics 228 may cause another page fault and VMM 114 may switch CR3 back to value 220, for access to the $6^{th}$ PTE from APT 212.

In some embodiments, VMM 114 may monitor the execution flow between APT 212 and PPT 224 to verify that the points the EIP enters and/or exits PPT 224 are as expected. Verification that the EIP jumps into PPT 224 at valid entry points and/or jumps out of PPT 224 at valid exit points, may facilitate a determination that TPM device driver 130 and/or other components in VM 120 are operating correctly. If the entry/exit point is not as expected, VMM 114 may determine that the access attempt to the partitioned TPM device driver 130 is unauthorized and may raise an exception, which in various embodiments could include rejecting the attempted access, reporting the rejected access attempt to OS 126 (for example, by injecting an invalid instruction exception) and/or causing a halt of OS 126 as controlled by VMM 114.

In various embodiments, the valid entry and/or exit points may be predetermined, such as, for example, at the time TPM device driver 130 is compiled, and/or may be dynamic. A dynamic entry and/or exit point may be created, such as, for example, when an interrupt occurs. For example, an interrupt may occur when the EIP is at the $3^{rd}$ PTE of PPT 224, VMM 114 may gain control, verify that the interrupt is authentic, and record the EIP value for use as a dynamic exit point. The dynamic exit point may then serve as a valid entry point upon reentry to the partitioned elements of PPT 224.

In embodiments of the present invention, VMM 114 may verify that the element calling the partitioned elements, such as, for example, PF2-PF4, is permitted to access them. For example, VMM 114 may receive a request from a component to access the partitioned elements. VMM 114 may identify the component, reference access permissions associated with the partitioned elements, and raise an exception if the access permissions do not permit the identified component to access the partitioned elements.

As previously indicated, embodiments of the present invention achieve high performance access to TPM secrets with a virtualized TPM in a VT enabled host platform without loss of performance or loss of security. In embodiments of the present invention, TPM 106 is virtualized by letting TPM device drivers 130 and 132 directly discover and access TPM 106, while protecting TPM device drivers 130 and 132 in guest OS 126 and guest OS 128, respectively. Only identified TPM device drivers (130 and 132) may access TPM 106. At VMM 114, processor locality is provided using VT Integrity Services module 138 to de-multiplex accesses to different registers of TPM 106, thereby virtualizing TPM 106. Thus, embodiments of the present invention are achieved by only allowing access to TPM 106 from verified TPM device drivers, allowing keys divulged to a TPM device drivers 130 and 132 to be used only when TPM device drivers 130 and 132 are executing, enabling that secure handoff of the key is made between TPM device drivers (130 and 132) and other security agents, and extending the traditional notion in TPMs of bus locality to processor locality.

Figure 3:
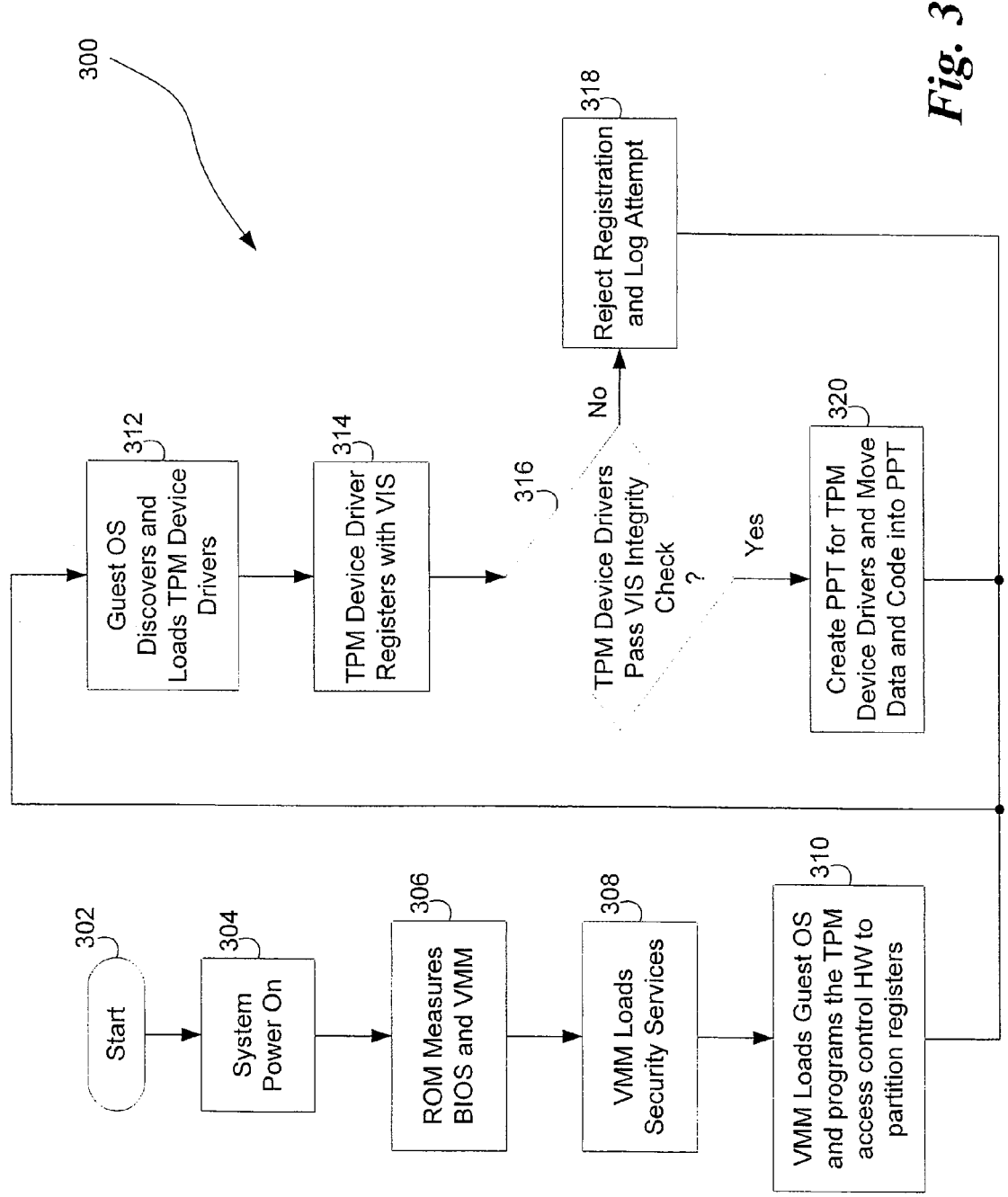
FIG. 3 is a flow diagram describing an exemplary method for platform startup according to an embodiment of the present invention.

Since VMM 114 is being used to partition access to TPM 106, when the system powers on, there is a need to measure the system from the bottom up. FIG. 3 is a flow diagram 300 describing an exemplary method for platform startup according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins at block 302, where the process immediately proceeds to block 304.

In block 304, the system is powered ON. The process then proceeds to block 306.

In block 306, the Read-Only Memory or ROM is set up to measure the BIOS (Basic Input/Output System) of the system. This is done to ensure that there are no hardware attacks being attempted on the system. In embodiments of the present invention, the VMM, which is an extension of the BIOS, is also measured. The process then proceeds to block 308.

In block 308, the VMM, after being measured, loads extension security services, such as, for example, the VT Integrity Services (VIS). The VIS performs integrity checks on the TPM device drivers and security agents, and manages the memory manager of the VMM. The process then proceeds to block 310.

In block 310, the VMM loads the guest operating systems, programs the TPM access control hardware to partition the TPM registers or PCRs for each guest operating system (VM), and transfers control to the guest operating systems. The VMM programs the TPM to appear as a device with n PCRs to the OS, where n equals the number of PCRs the TPM can support / the number of VMs to be supported). In one embodiment, the guest OSs are spawned by the VMM and control is then transferred to the VMs. The process then proceeds to block 312.

In block 312, each guest operating system, after discovering the TPM, load the programs representing the TPM device driver. The process then proceeds to decision block 314.

In block 314, the TPM device driver registers with the VT Integrity Services (VIS). Each TPM device driver must pass the VIS integrity check so that the platform knows the TPM device driver can be trusted. The process then proceeds to decision block 316.

In decision block 316, it is determined whether the TPM device driver passed the VIS integrity check. If the TPM device driver did not pass the VIS integrity check, then the process proceeds to block 318.

In block 318, the registration request for the TPM device driver is rejected and the attempt to register the TPM device driver is logged. If there are other guest operating systems to be initialized, the process returns to block 312.

Returning to decision block 316, if the TPM device drivers do pass the VIS integrity check, the process proceeds to block 320. In block 320, a protected page table (PPT) is created for the TPM device drivers and the TPM device driver data and code is moved into the PPT. If there are other guest operating systems to be initialized, the process returns to block 312.

Figure 4:
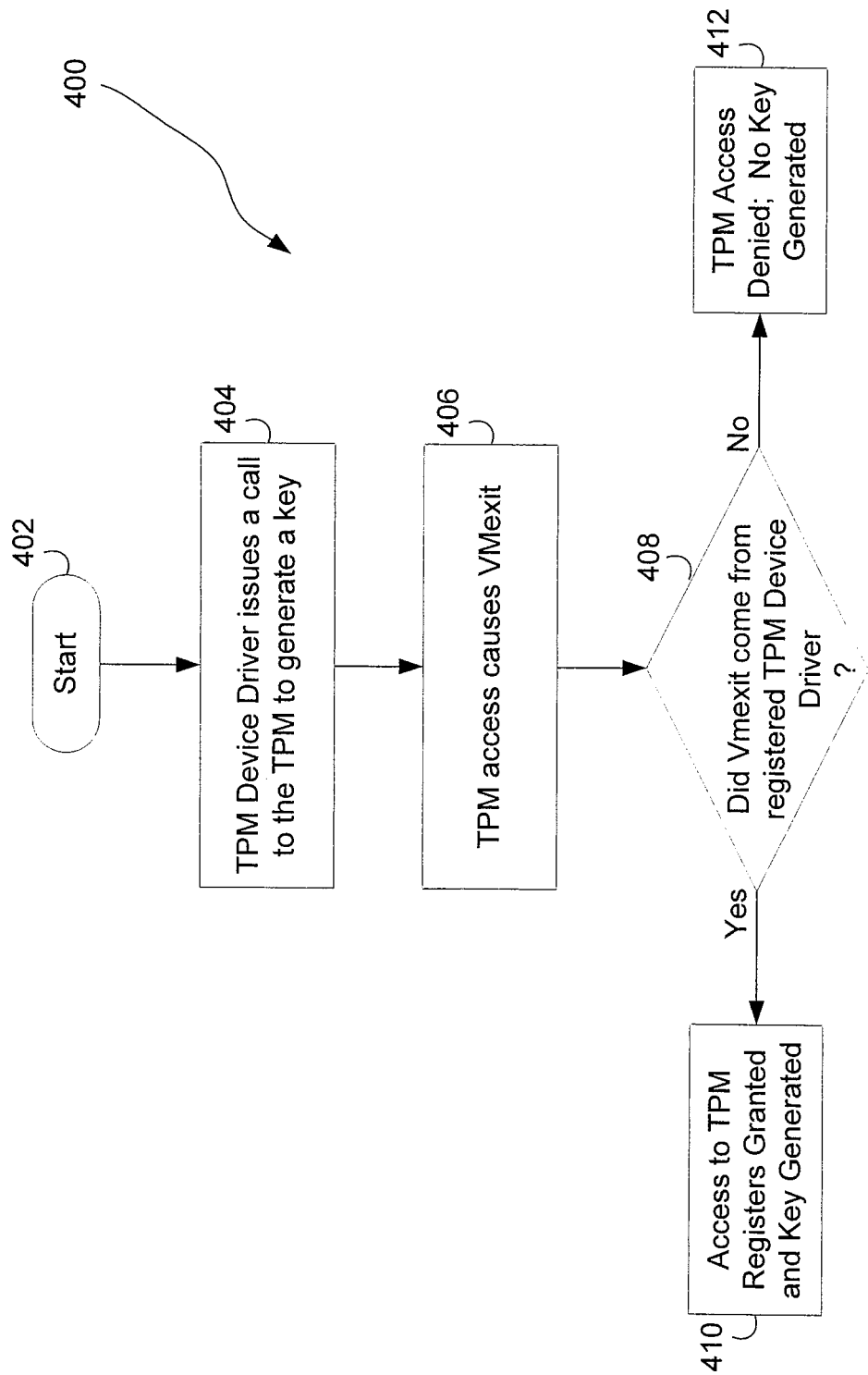
FIG. 4 is a flow diagram describing an exemplary method for TPM key generation according to an embodiment of the present invention.

FIG. 4 is a flow diagram 400 describing an exemplary method for TPM key generation according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins at block 402, where the process immediately proceeds to block 404.

In block 404, the TPM device driver issues a TPM call to generate a key. The process then proceeds to block 406.

In block 406, TPM access results in a VMexit. The process then proceeds to decision block 408.

In decision block 408, it is determined whether the VMexit came from a registered TPM device driver. If the VMexit came from a registered TPM device driver, then the process proceeds to block 410.

In block 410, access to a subset of TPM hardware registers or PCRs to generate the key is allowed. The access is based on a VMCS (Virtual Machine Control Structure) that enables the proper subset of PCRs to be accessed. The VMCS is a control structure that provides a VM identification (ID) and an Execution Instruction Pointer, which indicates to the VIS that this is actually coming from a registered TPM device driver. Once the proper subset of PCRs is accessed, the command to generate the key is executed. Execution of the command provides the key.

Returning to decision block 408, if it is determined that the VMexit did not come from a registered TPM device driver, the process proceeds to block 412. In block 412, access to the TPM hardware registers is denied. In other words, no key is provided.

Figure 5:
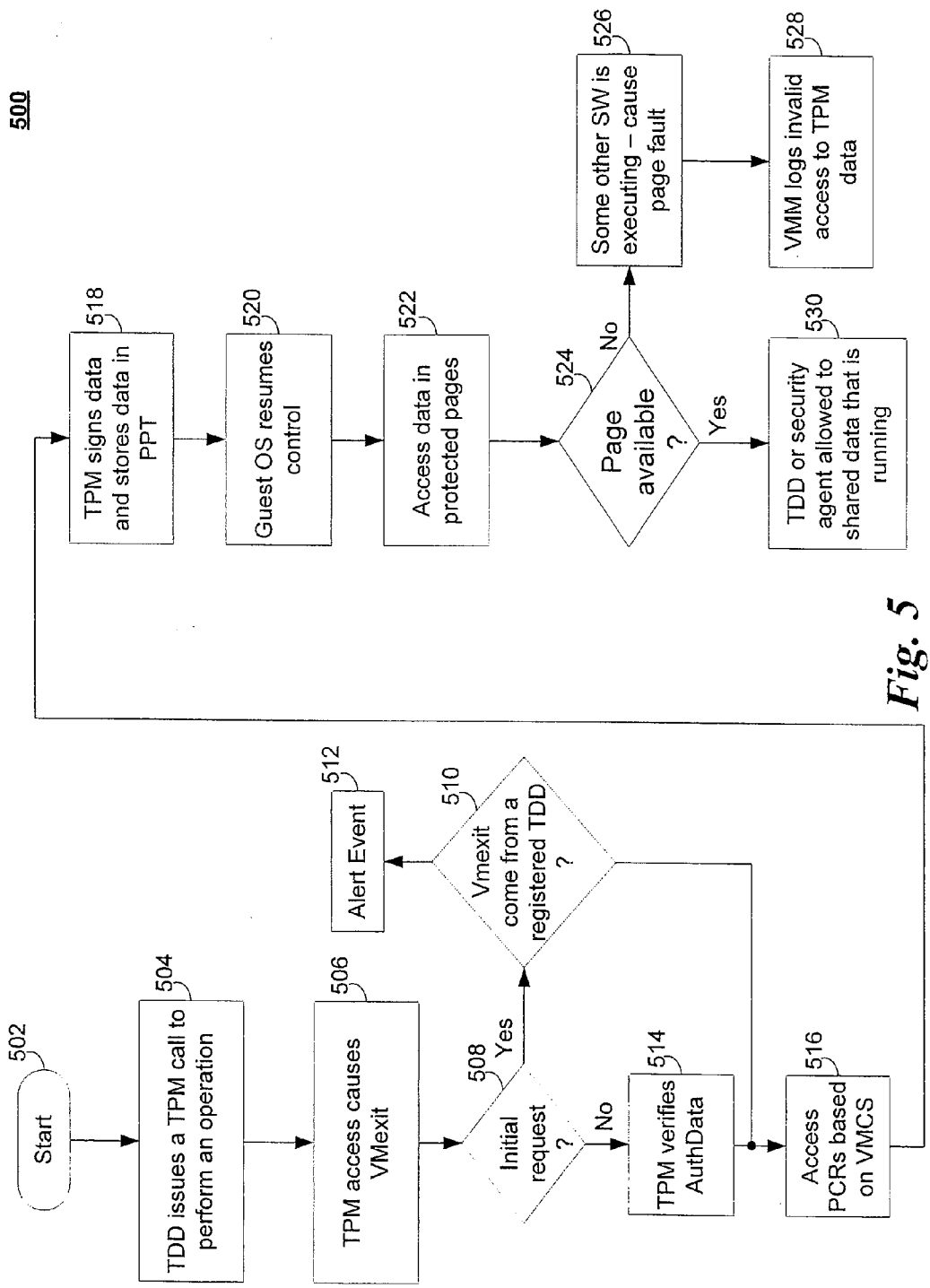
FIG. 5 is a flow diagram describing an exemplary method for TPM service access according to an embodiment of the present invention.

FIG. 5 is a flow diagram 500 describing an exemplary method for TPM service access according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins at block 502, where the process immediately proceeds to block 504.

In block 504, the TPM device driver issues a call to the TPM to perform an operation, such as, for example, to sign the data referenced in the command. The process then proceeds to block 506.

In block 506, TPM access causes a VMexit. The process then proceeds to decision block 508.

In decision block 508, it is determined whether this is an initial request. If this is an initial request, then the process proceeds to decision block 510.

In decision block 510, it is determined whether the VMexit came from a registered TPM device driver (TDD). If it did come from a registered TDD, then the process proceeds to block 516.

Returning to decision block 510, if it did not come from a registered TDD, then the process proceeds to block 512. In block 512, an alert event will occur to indicate that someone is trying to access the TPM without performing a registration. The process then ends.

Returning to decision block 508, if it is determined that this is not an initial request, the process proceeds to block 514. In block 514, the TPM verifies additional authentication data that was provided with the first access. The process then proceeds to block 516.

In block 516, based on a VMCS (Virtual Machine Control Structure), access to a subset of TPM hardware (HW) registers (or PCRs) is allowed. As previously indicated, the VMCS is a control structure that provides the VM identification and the Execution Instruction Pointer, which indicates to the VIS that this is actually coming from a registered TPM device driver. The process then proceeds to block 518.

In block 518, the TPM can perform the requested operation, such as, for example, signing the data referenced in the command. After the command is performed, the results are stored in the protected page table (PPT) so that only the TPM device driver can access this data. The process then proceeds to block 520.

In block 520, control is resumed by the VM guest OS. The process then proceeds to block 522.

In block 522, an access to the data in the PPT is requested. The process proceeds to decision block 524.

In decision block 524, it is determined whether the page is available. If the page is not available, the process proceeds to block 526.

In block 526, a page fault occurs because some other software is executing. The process then proceeds to block 528.

In block 528, the VMM logs an invalid access to the TPM data.

Returning to decision block 524, if it is determined that the page is available, the process proceeds to block 530. In block 530, the TDD or security agent is allowed to the shared data that is running.

When a security agent wishes to interact with the TPM device driver, the security agent must register with the VIS. If the integrity check performed by the VIS passes, a memory page is shared between the TPM device driver and the security agent.

Figure 6:
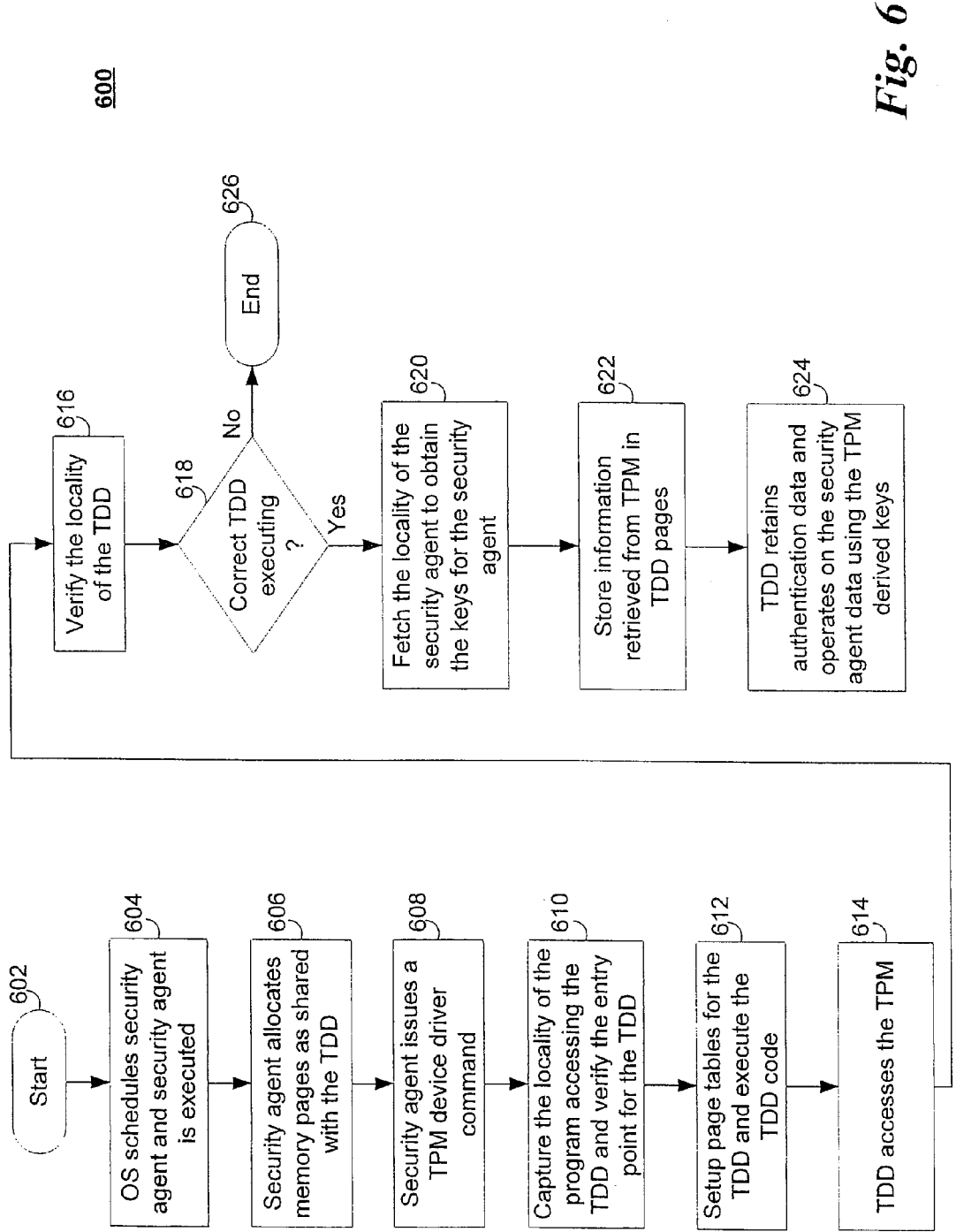
FIG. 6 is a flow diagram describing an exemplary platform runtime method according to an embodiment of the present invention.

FIG. 6 is a flow diagram 600 describing an exemplary platform runtime method according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. The process begins at block 602, where the process proceeds to block 604.

In block 604, a security agent is scheduled by the operating system. When the security agent code is executed, a VMexit is caused due to a page fault, and the security agent pages are installed. The security agent is integrity verified. The process then proceeds to block 606.

In block 606, after the integrity verification, the security agent allocates memory pages that are marked as "shared" with the TPM device driver. The process then proceeds to block 608.

In block 608, the security agent, running in seclusion, issues a TPM device driver command to generate a new key for agent usage and provide data that should be signed using this key in the shared page. The call to the TPM device driver causes a page fault. The process then proceeds to block 610.

In 610, the locality of the program accessing the TPM device driver is captured in a VMM only accessible data structure (defined as the VMCS) in the TPM access control module. Entry point verification for the TPM device driver is also performed. The process then proceeds to block 612.

In block 612, the page tables are setup for the TPM device driver code and the TPM device driver code then executes. The process then proceeds to block 614.

In block 614, the TPM device driver accesses the TPM HW directly, causing a VMexit (due to code instrumental to causing a VMcall). The process then proceeds to block 616.

In block 616, the locality of the TPM device driver is verified. The process then proceeds to decision block 618.

In decision block 618, it is determined whether the correct TPM device driver is executing. If the correct TPM device driver is executing, the process proceeds to block 620.

In block 620, the locality of the security agent is fetched from the TPM access control module to access the specific register set in the TPM for keys specific to the security agent. The process then proceeds to block 622.

In block 622, the information, such as, for example, an Attestation Identity Key (AIK), retrieved from the TPM is installed in the TPM device driver pages along with the TPM issued authentication data. The TPM issued authentication data is used for future accesses to the key(s). This information is accessible to the TPM device driver code as long as it is executing. If the OS scheduler is run due to a time interrupt, the TPM device driver pages containing the AIK or other information issued by the TPM and any computationally related data are removed from the page tables due to the page fault VMexit. The process proceeds to block 624.

In block 624, the TPM device driver retains the authentication data for future requests to the TPM for access to the AIK or other information. The TPM device driver operates on the security agent provided data using the TPM derived keys. The data is placed in a shared, protected page. When the security agent resumes execution, the signed data is available, but the key is not accessible.

Returning to decision block 618, if it is determined that the correct TPM device driver is not executing, the process proceeds to block 626, where the process ends.

Figure 7:
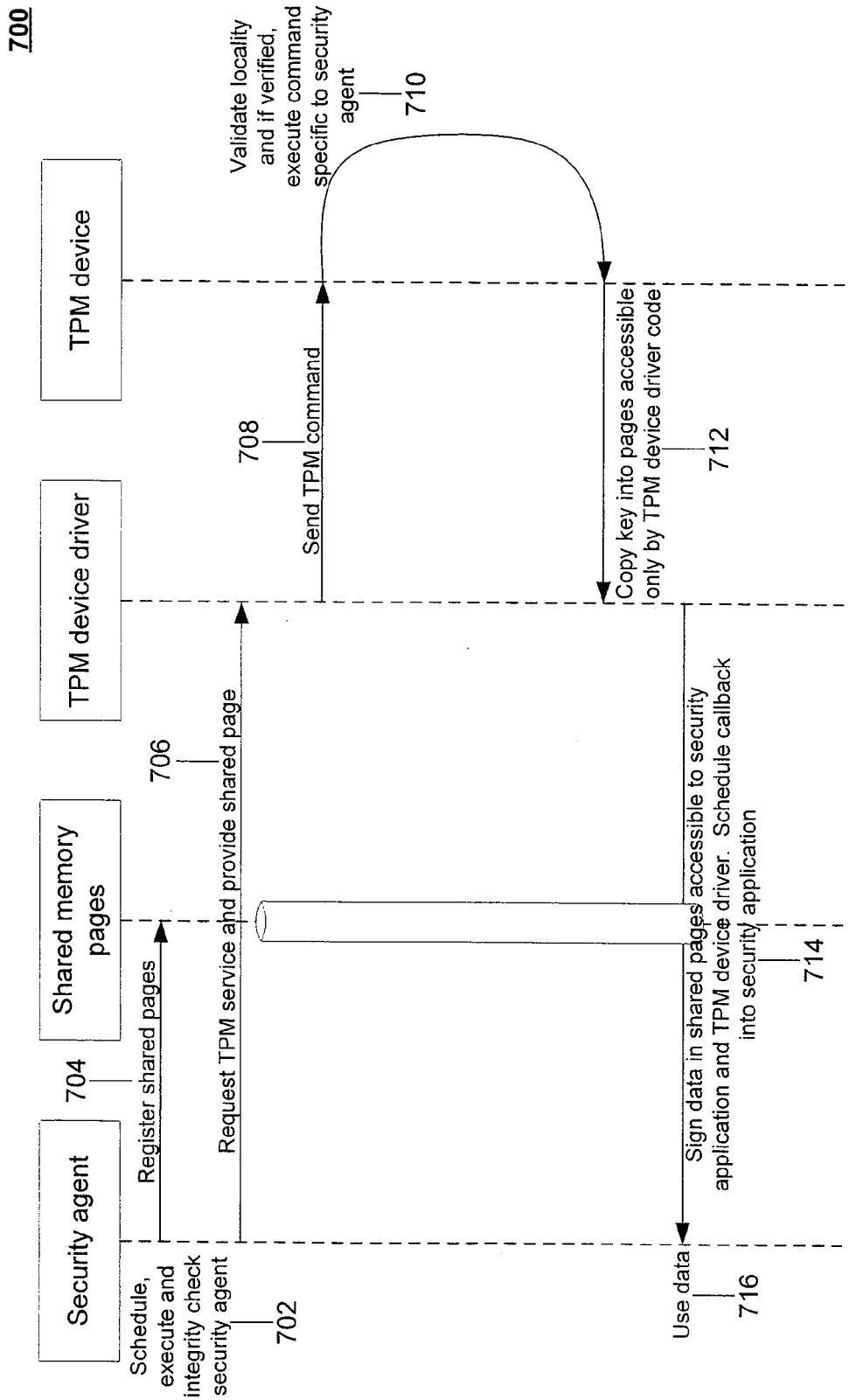
FIG. 7 is a flow diagram describing an exemplary method for a protected data transfer between a protected TPM device driver and a protected security application according to an embodiment of the present invention.

FIG. 7 is a flow diagram 700 describing an exemplary method for a protected data transfer between a protected TPM device driver and a protected security application according to an embodiment of the present invention. The invention is not limited to the embodiment described herein with respect to flow diagram 700. Rather, it will be apparent to persons skilled in the relevant art(s) after reading the teachings provided herein that other functional flow diagrams are within the scope of the invention. The process begins at 702, where the security agent is scheduled by the operating system. When the security agent is executed, a VMexit is caused due to a page fault, and the security agent pages are installed. The security agent is integrity verified by the VIS. After being integrity verified, the security agent allocates memory pages that it marks as "shared" with the TPM device driver.

At 704, the security agent registers the shared pages.

At 706, the security agent sends a request to the TPM device driver (TDD) for TPM services and provides the shared pages to the TPM device driver.

At 708, the TPM device driver sends a TPM command corresponding with the security agent's request for TPM services. Upon sending the command to access the TPM, a VMexit occurs. If this is an initial request, it is determined whether the VMexit came from a registered TDD. If this is not an initial request, then authentication data will need to be verified.

At 710, the TPM verifies the authentication data, and based on the VMCS, enables access to the respective subset of TPM HW registers or PCRs. The TPM command specific to the security agent is executed if the verification is correct.

At 712, the key is copied into pages accessible only by the TPM device driver code. This enables the TPM device driver to sign data in the shared pages that are accessible to both the security application (or agent) and the TPM device driver (TDD) at 714. The TDD also schedules a callback into the security application so that the security agent may use the data at 716.

Figure 8:
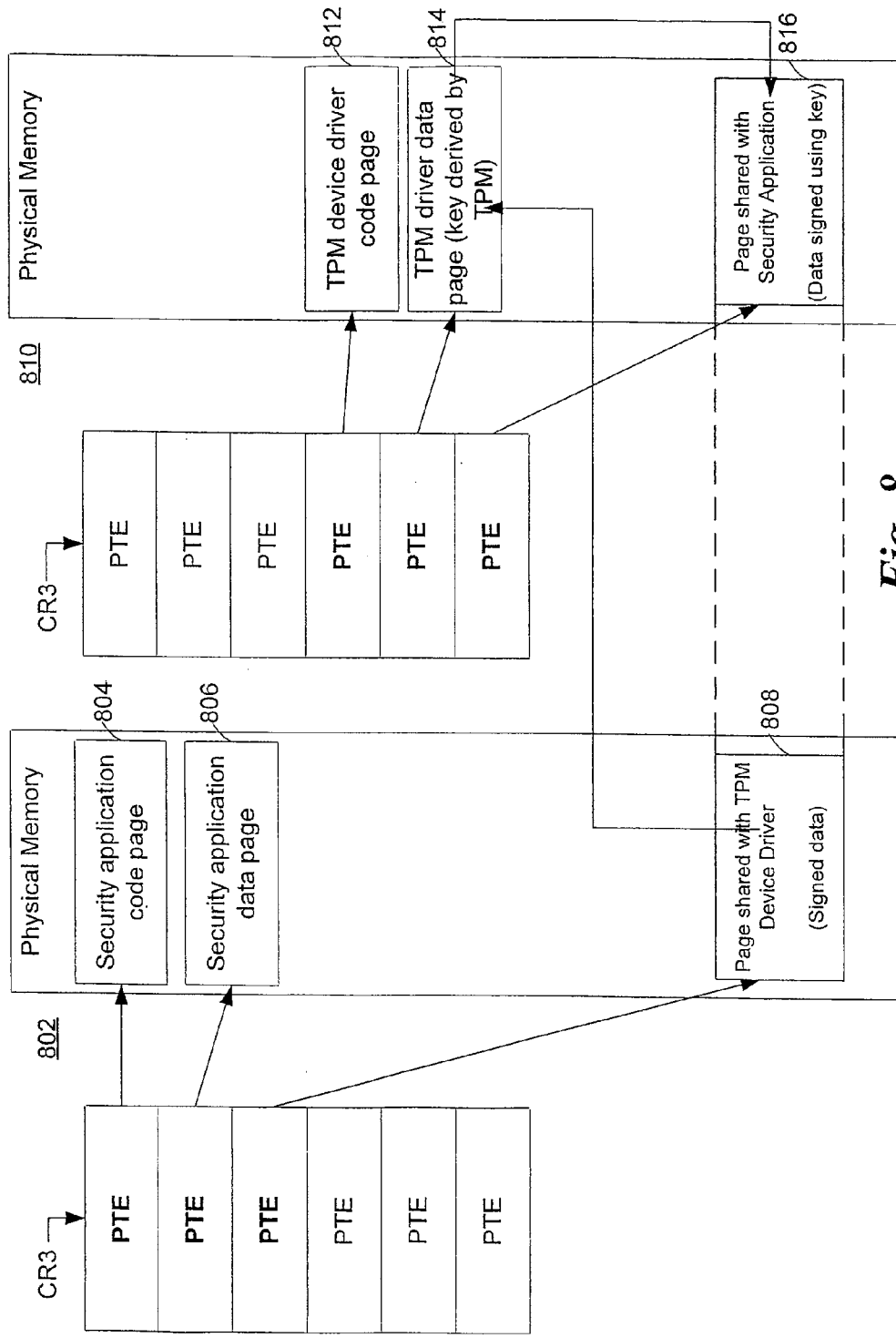
FIG. 8 is a diagram illustrating exemplary page table entries for secure usage of TPM keys during interactions shown in FIG. 7 according to an embodiment of the present invention.

FIG. 8 is a diagram 800 illustrating exemplary page table entries showing secure usage of TPM keys during interactions shown in FIG. 7 according to an embodiment of the present invention. FIG. 8 shows page table mapping to physical memory when the security application is executing 802 and page table mapping to physical memory when the TPM device driver is executing 810. When the security application is executing, physical memory shows a security application code page 804, a security application data page 806, and a page shared with the TPM device driver having signed data 808. When the TPM device driver is executing, physical memory shows a TPM device driver code page 812, a TPM device driver data page that includes a key derived by the TPM 814, and a page shared with the security application having data signed using the key 816. Note that when some other component or OS is executing, both the security agent and the TPM pages are not available in the page table entries.

In an alternative embodiment of the present invention, the TPM device driver may be implemented as a Dynamic-Link Library (DLL) linked directly into the security application. Using a DLL linked directly into the security application simplifies the runtime process of FIG. 6 because the DLL is contained in the protected agent's protected page tables, and thus, eliminates the need for blocks 610-612. When using a DLL linked directly into the security application, the key is accessible to the protected agent only up to the point where execution transfers outside the security agent. At that point, a page fault triggers a VMexit which removes the pages containing the AIK and any computationally related data from the page tables.

Figure 9:
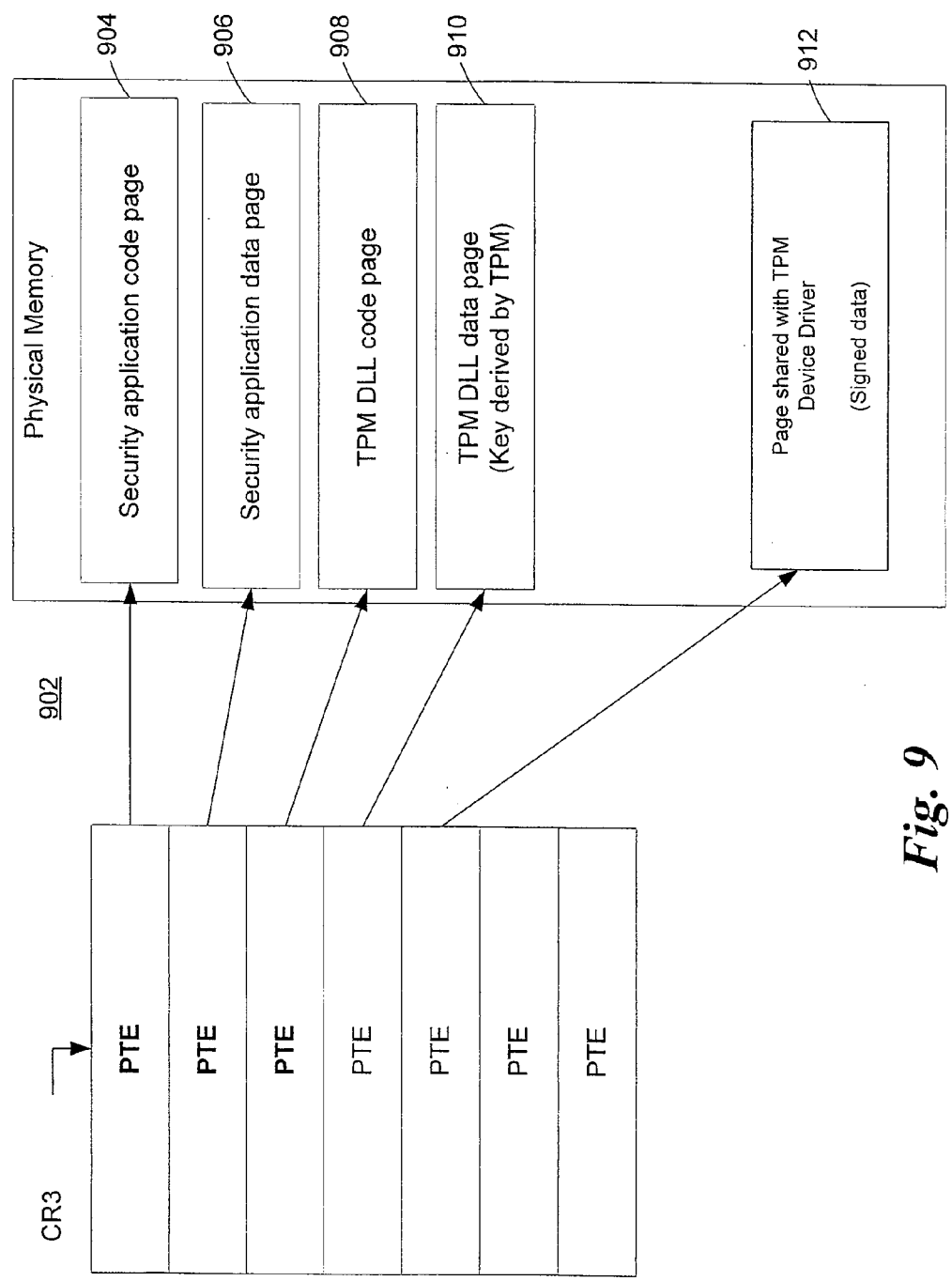
FIG. 9 is a diagram illustrating an exemplary page table mapping with a DLL based TPM interface according to an embodiment of the present invention.

FIG. 9 is a diagram 900 illustrating an exemplary page table mapping with a DLL based TPM interface according to an embodiment of the present invention. FIG. 9 shows page table mapping to physical memory when the security application and the TPM DLL are executing 902. Physical memory shows a security application code page 904, a security application data page 906, a TPM DLL code page 908, a TPM DLL data page including the key derived by the TPM 910, and a page shared with the TPM device driver which includes signed data 912. When some other component or OS is executing, both the security agent and the TPM pages are not available in the page table entries.

Embodiments of the present invention may be implemented using hardware, software, or a combination thereof and may be implemented in one or more computer systems, as shown in FIG. 1, or other processing systems. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include at least one processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

The invention claimed is:

1. A hardware platform comprising:
   Virtual Machine Monitor (VMM) managed components coupled to a VMM, wherein one of the VMM managed components comprises a Trusted Platform Module (TPM); and
   a plurality of Virtual Machines (VMs), each of the VMs including a guest operating system (OS), a TPM device driver (TDD), and at least one security application,
   wherein the VMM is to create an intra-partition in memory for the TDD such that other code and information at a same or higher privilege level within the VM cannot access the memory contents of the TDD and to map accesses from only the TDD to a TPM register space specifically designated for the VM requesting access,
   wherein the TPM register space is to be partitioned into a plurality of subsets of the TPM register space, and
   wherein each separate VM is assigned to a separate subset of the TPM register space as a function of a unique identifier of the corresponding VM such that the unique identifier uniquely identifies the corresponding VM and the subset of the TPM register space to which the corresponding VM is assigned for dedicated access thereto.

2. The hardware platform of claim 1, wherein contents of the TPM requested by the TDD are stored in an exclusively VMM-managed protected page table (PPT) that provides hardware-based memory isolation for the TDD.

3. The hardware-platform of claim 1, further comprising a Virtualization Technology (VT) Integrity Services (VIS) module to verify the integrity of the TDD and the at least one security application prior to enabling access of the TPM.

4. The hardware platform of claim 3, wherein one of the plurality of VMs provides management and administrative services to the VIS.

5. The hardware platform of claim 1, the VMM comprising a TPM access control module to partition the TPM register space across each of the VMs so that each of the VMs is assigned a dedicated TPM register set, wherein the TPM register set is identified using a VM Identification (ID).

6. The hardware platform of claim 5, wherein each TPM register set has a location identified by a separate Execution Instruction Pointer (EIP) field.

7. The hardware platform of claim 1, the VMM comprising a memory manager, the memory manager coupled to a Virtualization Technology (VT) Integrity Services (VIS) module, wherein the memory manager is to create the intra-partition including separate protected page tables between components in the same VM or guest OS after the components are integrity checked by the VIS.

8. The hardware platform of claim 1, wherein a Virtual Machine Control Structure (VMCS) is used to identify a Virtualization Technology (VT) Integrity Services (VIS)-protected TDD requesting access to the TPM, the VMCS including a VM ID field, an Execution Instruction Pointer (EIP) field, and other fields.

9. The hardware platform of claim 1, wherein the TDD is verified in-memory prior to accessing the TPM.

10. The hardware platform of claim 1, wherein keys from a TPM divulged to the TDD in-memory are used only when the TDD is executing to enable a secure handoff of the keys between the TDD and a security agent.

11. The hardware platform of claim 1, wherein the VMM programs the TPM to appear as a device with n Platform Configuration Registers (PCRs) for each operating system, wherein n represents the number of PCRs the TPM supports divided by the number of VMs to be supported.

12. The hardware platform of claim 1, further comprising a second plurality of Virtual Machines (VMs), each of the second plurality of VMs does not have a dedicated TPM register space.

13. The hardware platform of claim 1, wherein the VMM comprises a measured VMM.

14. One or more non-transitory machine-readable storage media comprising a plurality of instructions stored thereon that, in response to execution by a computing device, cause the computing device to:
   create, by a Virtual Machine Monitor (VMM) of the computing device, an intra-partition in memory for a Trusted Platform Module device driver (TDD) corresponding with a Trusted Platform Module (TPM) such that other code and information at a same or higher privilege level within a virtual machine (VM) cannot access the memory contents of the TDD, wherein the VM is one of a plurality of VMs and each of the VMs includes a guest operating system, a corresponding TDD, and at least one security application;

map, by the VMM, accesses from only the TDD to a TPM register space specifically designated for the VM requesting access; and partition the TPM register space into a plurality of subsets of the TPM register space, wherein each separate VM is assigned to a separate subset of the TPM register space as a function of a unique identifier of the corresponding VM such that the unique identifier uniquely identifies the corresponding VM and the subset of the TPM register space to which the corresponding VM is assigned for dedicated access thereto.

15. The one or more machine-readable non-transitory storage media of claim 14, wherein the plurality of instructions further cause the computing device to store contents of the TPM requested by the TDD in an exclusively VMM-managed protected page table (PPT) that provides hardware-based memory isolation for the TDD.

16. The one or more non-transitory machine-readable storage media of claim 14, wherein each subset of the TPM register space has a location identified by a separate Execution Instruction Pointer (EIP) field.

17. The one or more non-transitory machine-readable storage media of claim 14, wherein the plurality of instructions further cause the computing device to access the TPM in response to in-memory verification of the TDD.

18. The one or more non-transitory machine-readable storage media of claim 14, wherein the plurality of instructions further cause the computing device to divulge keys from the TPM to the TDD in response to an execution of the TDD to enable a secure handoff of the keys between the TDD and a security agent.

19. The one or more non-transitory machine-readable storage media of claim 14, wherein the plurality of instructions further cause the computing device to program, by the VMM, the TPM to appear as a device with n Platform Configuration Registers (PCRs) for each operating system, wherein n represents the number of PCRs the TPM supports divided by the number of VMs to be supported.

20. The hardware platform of claim 1, wherein the unique identifier of the corresponding VM is used as an offset to the TPM register space to assign the corresponding VM to the separate subset of the TPM register space.

* * * * *